United States Patent
Stegmiller et al.

(10) Patent No.: US 9,828,098 B2
(45) Date of Patent: Nov. 28, 2017

(54) MODULAR POWER DRIVE UNIT SYSTEM

(71) Applicant: Goodrich Corporation, Charlotte, NC (US)

(72) Inventors: Wesley K. Stegmiller, Jamestown, ND (US); Aaron J. Roberts, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 219 days.

(21) Appl. No.: 14/299,675

(22) Filed: Jun. 9, 2014

(65) Prior Publication Data
US 2015/0353198 A1    Dec. 10, 2015

(51) Int. Cl.
| | |
|---|---|
| *B65G 13/06* | (2006.01) |
| *B65G 23/00* | (2006.01) |
| *B65G 23/22* | (2006.01) |
| *B64D 9/00* | (2006.01) |
| *H02K 17/02* | (2006.01) |
| *H02K 5/22* | (2006.01) |

(52) U.S. Cl.
CPC ............... *B64D 9/00* (2013.01); *H02K 5/225* (2013.01); *H02K 17/02* (2013.01); *B64D 2009/006* (2013.01); *B65G 13/06* (2013.01); *Y02T 50/46* (2013.01)

(58) Field of Classification Search
None
See application file for complete search history.

(56) References Cited

U.S. PATENT DOCUMENTS

| | | | | |
|---|---|---|---|---|
| 4,978,320 A | * | 12/1990 | Chaplin ............... | B63H 21/305 188/377 |
| 5,526,923 A | * | 6/1996 | Johansson ................ | B64D 9/00 198/722 |
| 6,802,412 B2 | * | 10/2004 | Lapeyre ............... | B65G 47/844 198/370.02 |

(Continued)

FOREIGN PATENT DOCUMENTS

| | | |
|---|---|---|
| EP | 1935782 | 6/2008 |
| EP | 2918496 | 9/2015 |
| GB | 2294672 | 5/1996 |

OTHER PUBLICATIONS

Extended European Search Report dated Oct. 28, 2015 in European Application No. 15171148.8.

*Primary Examiner* — Kavel Singh
(74) *Attorney, Agent, or Firm* — Snell & Wilmer, L.L.P.

(57) ABSTRACT

Aircraft cargo management systems comprising a support structure comprising a first rail and a second rail, the first rail arranged parallel to the second rail, wherein the first rail has a first exterior face and the second rail has a second exterior face, a wheel mounted on an axle, the axle mounted to the first exterior face and passing through the second exterior face, and a power drive unit ("PDU") mounted to the axle and configured to rotate the axle about an axis are provided. PDUs comprising an electronic controller housed in a controller housing, a motor housed in a motor housing, and a first connecter mounted to the motor housing and a second connector mounted to the controller housing, the first connector configured to mate with the second connector and to conduct electricity between the motor and the electronic controller are also provided.

16 Claims, 5 Drawing Sheets

(56) References Cited

U.S. PATENT DOCUMENTS

| | | | | |
|---|---|---|---|---|
| 6,814,222 B2 * | 11/2004 | Henson | ................ | B65G 13/071 |
| | | | | 198/781.06 |
| 6,923,878 B2 * | 8/2005 | Davis | .................... | B65C 9/1865 |
| | | | | 156/351 |
| 7,086,517 B2 | 8/2006 | Clos et al. | | |
| 7,204,479 B2 * | 4/2007 | Power | ..................... | F16F 1/387 |
| | | | | 267/140.12 |
| 7,274,305 B1 * | 9/2007 | Luttrell | ..................... | B61L 1/20 |
| | | | | 324/141 |
| 8,758,693 B2 * | 6/2014 | Bria | ........................ | F23G 7/068 |
| | | | | 137/311 |
| 2005/0224645 A1 * | 10/2005 | Huber | ....................... | B64C 1/20 |
| | | | | 244/118.1 |

* cited by examiner

MODULAR POWER DRIVE UNIT SYSTEM

FIELD

The present disclosure relates to aircraft cargo management systems and modular power drive units.

BACKGROUND

Typically large aircraft cargo management systems utilize a plurality of power drive units ("PDUs"). The PDUs may help to assist pallets and containers when traveling from fore to aft and from aft to fore of an aircraft along trays. Space within trays is typically limited because of the presence of various systems, such as transport rollers and cargo restraints.

SUMMARY

Aircraft cargo management systems comprising a support structure comprising a first rail and a second rail, the first rail arranged parallel to the second rail, wherein the first rail has a first exterior face and the second rail has a second exterior face; a wheel mounted on an axle, the axle mounted to the first exterior face and passing through the second exterior face, and a power drive unit ("PDU") mounted to the axle and configured to rotate the axle about an axis are disclosed.

PDUs comprising an electronic controller housed in a controller housing, a motor housed in a motor housing, and a first connecter mounted to the motor housing and a second connector mounted to the controller housing, the first connector configured to mate with the second connector and to conduct electricity between the motor and the electronic controller are also disclosed.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, electrical, and mechanical changes may be made without departing from the spirit and scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact.

Figure 1:
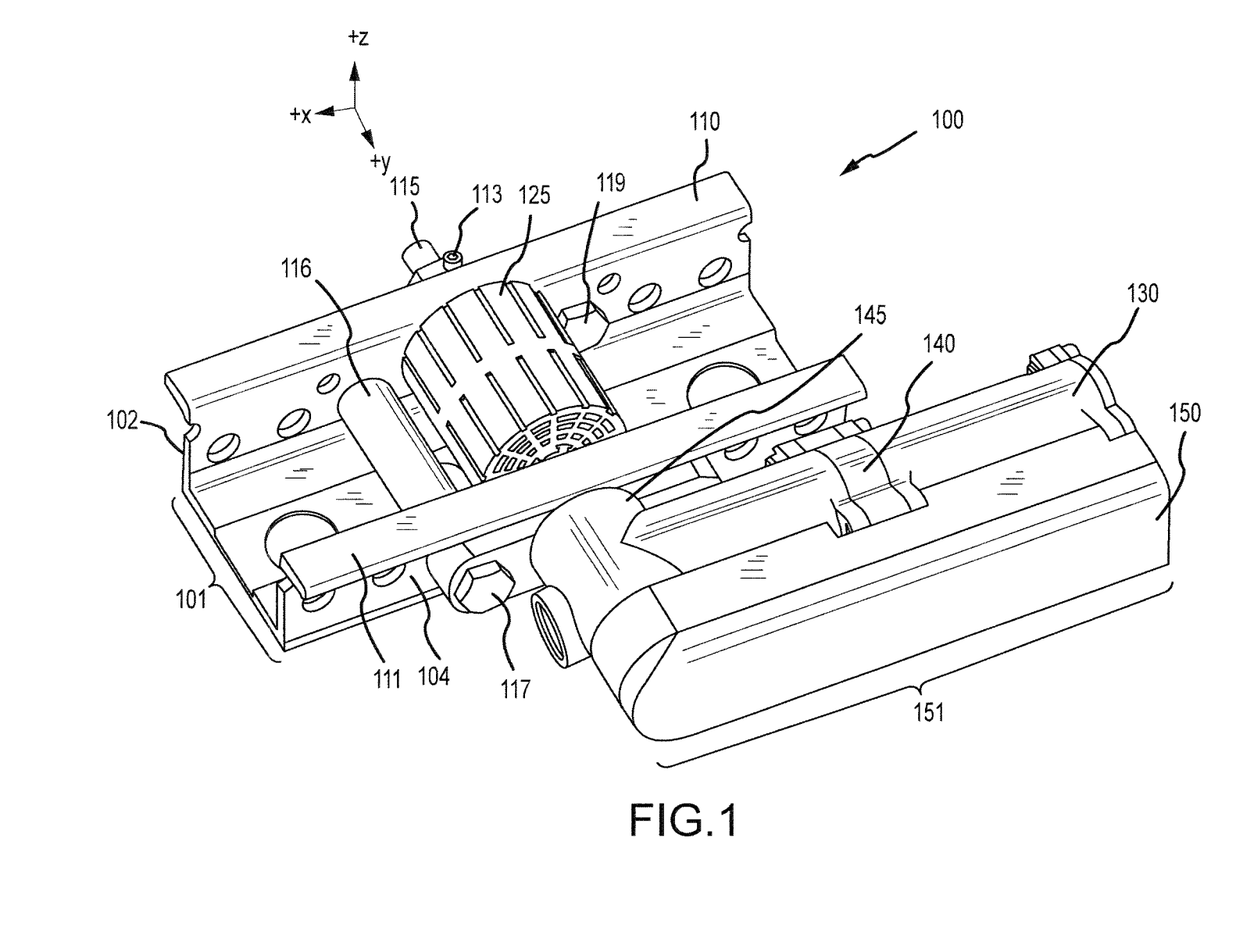
FIG. 1 illustrates a right angle power drive unit system, in accordance with various embodiments.

With reference to FIG. 1, aircraft cargo management system 100 is illustrated in accordance with various embodiments. In various embodiments, aircraft cargo management system 100 may comprise a support structure 101 comprising a first rail 110 and a second rail 111, the first rail 110 arranged parallel to the second rail 111. As illustrated in FIG. 1, in various embodiments, the first rail 110 may have a first exterior face 102 and the second rail 111 may have a second exterior face 104. The support structure is not particularly limited and may include any now known or hereinafter developed support structure 101 suitable for aircraft cargo management systems. For example, in various embodiments, the distance between first rail 110 and second rail 111 may be about 2.60 inches (about 6.604 centimeters) or may be about 3.94 inches (about 10.01 centimeters), where the term about in this context only may include a value within ±10%.

In various embodiments, a tire 125 may be mounted on a wheel 120 (shown in FIG. 2), which may be mounted on an axle 115. As illustrated in FIG. 1, the axle 115 may be mounted to the first exterior face 102 and pass through the second exterior face 104. The method of mounting axle 115 is not particularly limited and may include, in various embodiments, disposing the axle through the first exterior face 102 of support structure 101. For example, as shown in FIG. 1, axle 115 may pass through the first exterior face 102 and the second exterior face 104. In various embodiments, axle 115 may be mounted to an interior face of first rail 110. For example, axle 115 may be coupled to a rotational hardware component that is capable of supporting axle 115 for rotation, the rotational hardware component itself being coupled to the first rail 110. The rotational hardware may comprise, for example, a swivel joint, a static and rotating disk pair, and the like. According to various embodiments, axle 115 may be secured by end fastener 113 and bolt 119. In various embodiments, an aircraft cargo handling system may comprise a power drive unit ("PDU") 151, which may comprise a controller housing 150, a motor housing 130, a planetary gearbox 140, and a right angle gearbox 145. According to various embodiments, PDU 151 may be mounted to the axle 115 and configured to rotate the axle 115 about an axis (e.g., the y-axis). In various embodiments, PDU 151 may be mounted to the support structure 101 via a first bolt 117 and with spacer 116.

In various embodiments, mounting the PDU 151 to the support structure 101 may reduce the weight and costs when compared to conventional systems. Moreover, in various embodiments, mounting the PDU 151 to the support structure 101 may reduce the machining required and the costs associated with conventional systems. Furthermore, in accordance with various embodiments, mounting the PDU 151 to the support structure 101 may allow for more space within the support structure 101, for other systems, such as restraints and latches (not shown).

Figure 2:
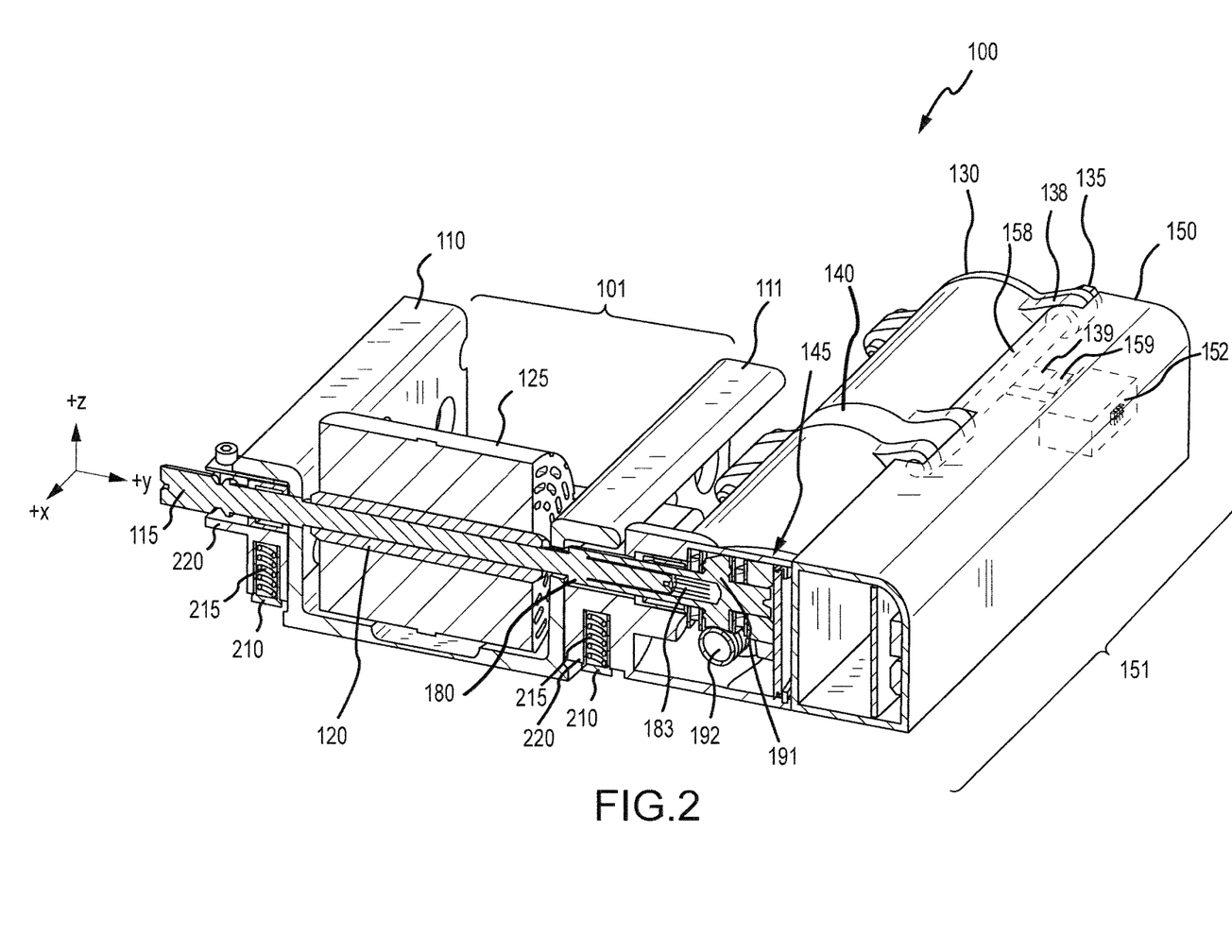
FIG. 2 illustrates a cross-sectional view of a power drive unit system, in accordance with various embodiments.
Figure 3:
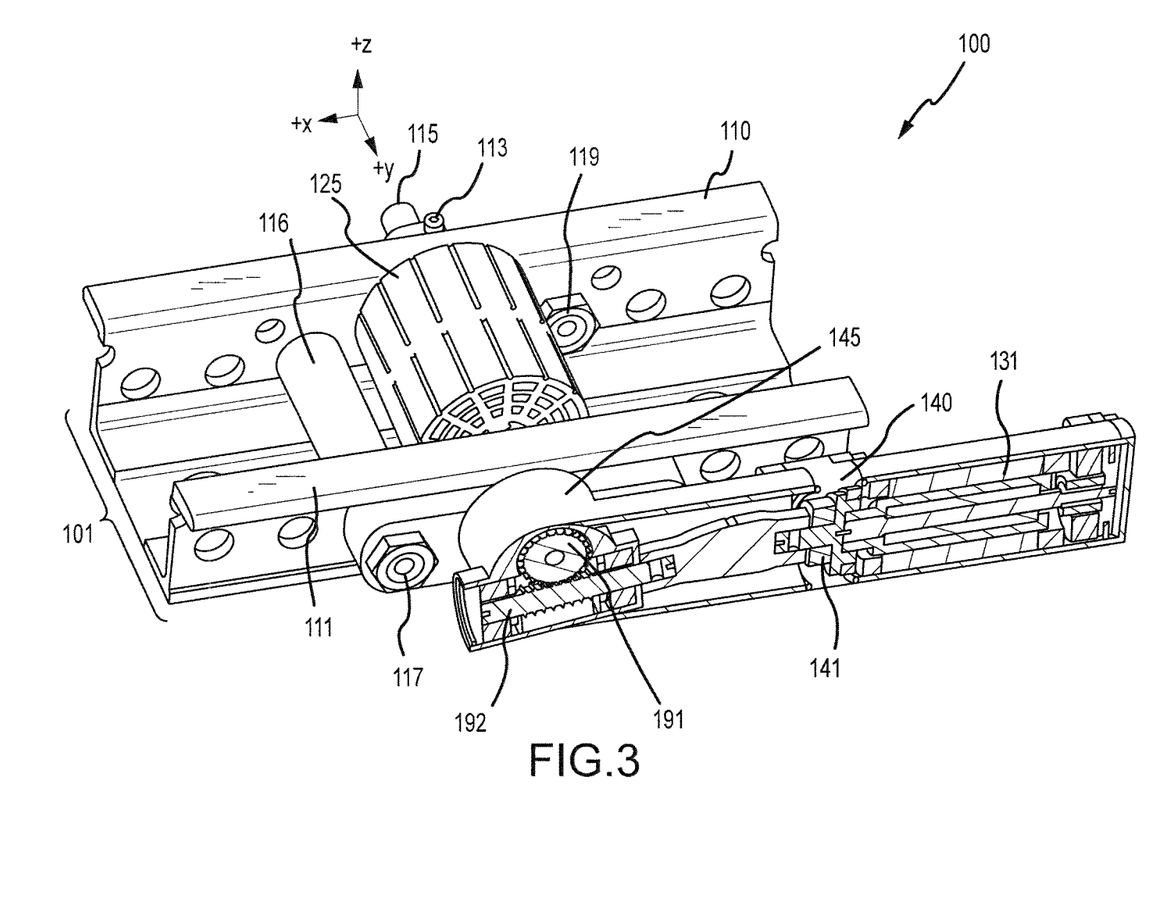
FIG. 3 illustrates a cross-sectional view of a right angle power drive unit system, in accordance with various embodiments.
Figure 4:
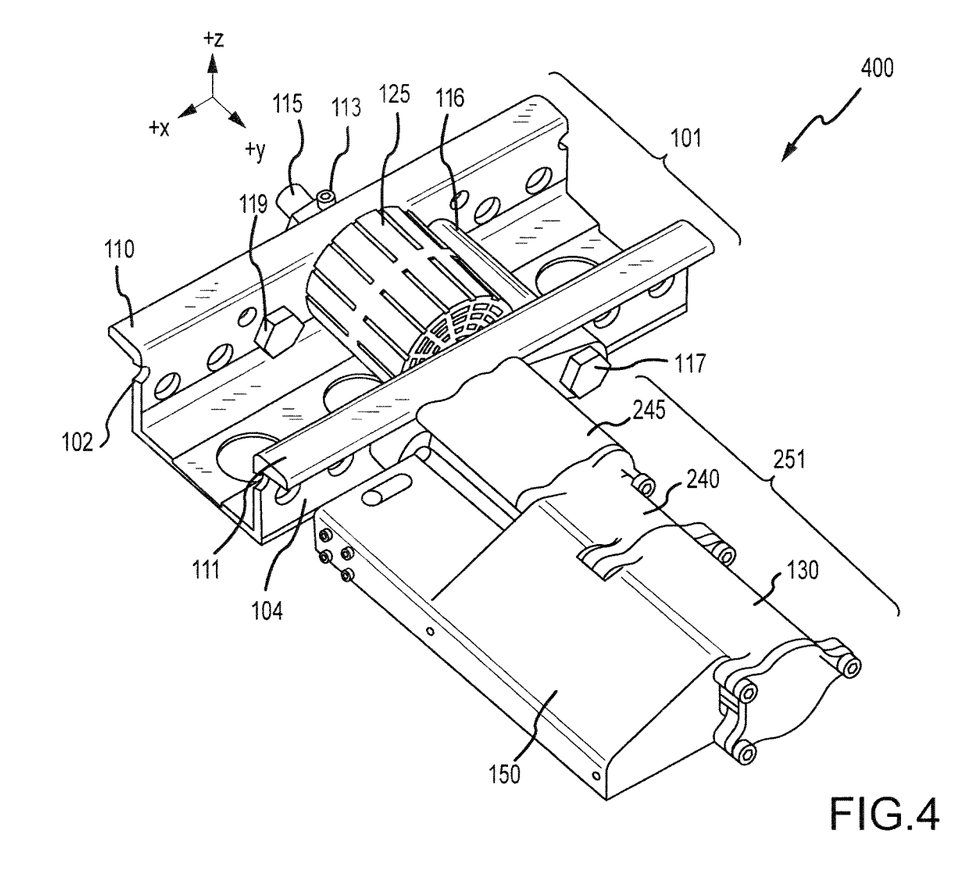
FIG. 4 illustrates a power drive unit system, in accordance with various embodiments.

According to various embodiments, the PDU 151 is not particularly limited. For example, according to various embodiments, PDU 151 may comprise a right angle gearbox 145 and PDU 151 may be parallel to the support structure 101 (as shown in FIGS. 1-3). According to various embodiments, the PDU may be positioned substantially perpendicular to the support structure 101 (as shown in FIG. 4 and described below). In various embodiments, the PDU 151 may be placed below the surface of a cargo floor.

Figure 5:
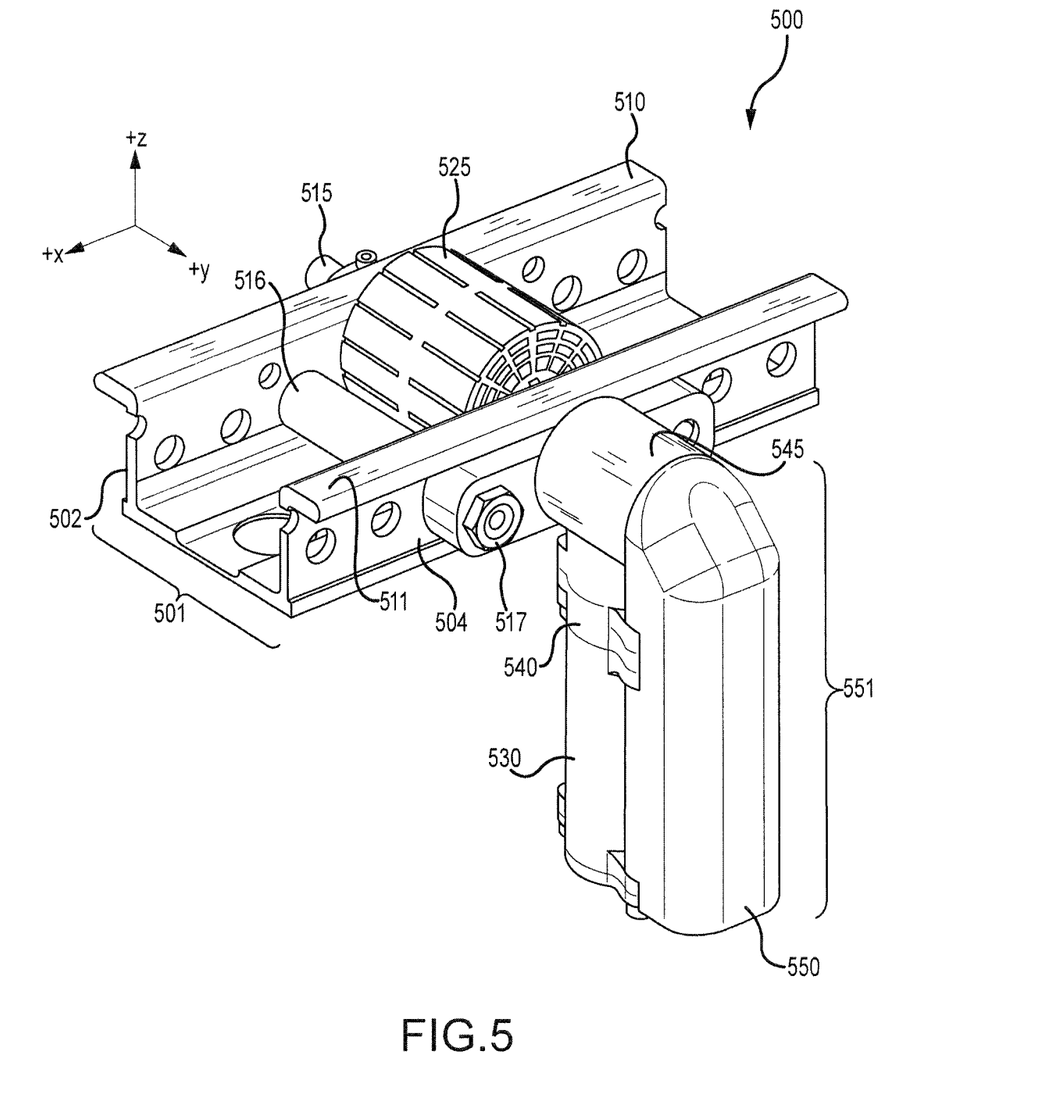
FIG. 5 illustrates a right angle power drive unit system, in accordance to various embodiments.

For example, with temporary reference to FIG. 5, aircraft cargo management system 500 is illustrated in accordance with various embodiments. As illustrated in FIG. 5, aircraft cargo management system 500 may comprise a PDU 551, which may extend below the surface of a cargo floor (e.g., below the x-y plane). For example, as shown in FIG. 5, the PDU 551 may extend substantially orthogonal to the x-y plane (e.g., in the negative z direction). In various embodiments, an aircraft cargo management system 500 comprising PDU 551 that extends below the surface of a cargo floor may reduce the space of the cargo floor (e.g., along the x-y plane) occupied by the aircraft cargo management system 500 (e.g., PDU 551).

In various embodiments, aircraft cargo management system 500 may comprise a support structure 501 comprising a first rail 510 and a second rail 511, the first rail 510 arranged parallel to the second rail 511. As illustrated in FIG. 5, in various embodiments, the first rail 510 may have a first exterior face 502 and the second rail 511 may have a second exterior face 504. The support structure is not particularly limited and may include any now known or hereinafter developed support structure 501 suitable for aircraft cargo management systems. For example, in various embodiments, the distance between first rail 510 and second rail 511 may be about 2.60 inches (about 6.604 centimeters) or may be about 3.94 inches (about 10.01 centimeters), where the term about in this context only may include a value within ±10%.

In various embodiments, a tire 525 may be mounted on a wheel 120 (shown in FIG. 2), which may be mounted on an axle 515. As illustrated in FIG. 5, the axle 515 may be mounted to the first exterior face 502 and pass through the second exterior face 504. The method of mounting the axle 515 is not particularly limited and may include, in various embodiments, disposing the axle through a face of support structure 501. For example, as shown in FIG. 5, axle 515 may pass through the first exterior face 502 and the second exterior face 504. According to various embodiments, axle 515 may be secured by end fastener 513 and bolt 519. In various embodiments, an aircraft cargo handling system may comprise a power drive unit ("PDU") 551, which may comprise a controller housing 550, a motor housing 530, a planetary gearbox 540, and a right angle gearbox 545. According to various embodiments, PDU 551 may be mounted to the axle 515 and configured to rotate the axle 515 about an axis (e.g., the y-axis). In various embodiments, PDU 551 may be mounted to the support structure 501 via a first bolt 517 and with spacer 516.

In various embodiments, mounting the PDU 551 to the support structure 501 may reduce the weight and costs when compared to conventional systems. Moreover, in various embodiments, mounting the PDU 551 to the support structure 501 may reduce the machining required and the costs associated with conventional systems. Furthermore, in accordance with various embodiments, mounting the PDU 551 to the support structure 501 may allow for more space within the support structure 501, for other systems, such as restraints and latches (not shown).

Moreover, with reference to FIG. 2 and in various embodiments, the PDU 151 may comprise an electronic controller 152 housed in a controller housing 150. In various embodiments, electronic controller 152 is not particularly limited. For example, according to various embodiments, electronic controller 152 may comprise an integrated sensor, such as an infra-red light, which may be configured to detect the presence of cargo above the PDU 151.

PDU 151 may also comprise a motor 131 (shown in FIG. 3) housed in a motor housing 130. With reference back to FIG. 2, in various embodiments, a first connector 139 may be mounted to the motor housing 130. PDU 151 may also comprise a second connector 159 mounted to the controller housing 150. According to various embodiments, the first connector 139 may be configured to mate with the second connector 159 and to conduct electricity between the motor 131 and the electronic controller 152. The first connector 139 and the second connector 159 are not particularly limited. For example, either the first connector 139 or second connector 159 may be at least one of a pigtail connector, a header connector, or a pin-to-socket connector.

In various embodiments, the PDU 151 may be a modular PDU. As used herein, the term "modular" or "module" may include a set of separate units that house one or more components, such as an electronic controller. A module may comprise one or more connectors and/or other structures that allow, for example, an electronic controller to be placed in electronic communication with another component of a PDU, for example, a motor. A module may be replaced or serviced (e.g., by maintenance personnel) by replacing a used module with a new module.

For example, in various embodiments the motor housing 130 may comprises a first mating feature 138 and, in various embodiments, the controller housing 150 may also comprises a second mating feature 158. In accordance with various embodiments, the first mating feature 138 and the second mating feature 158 may be configured to engage and secure the motor housing 130 to the controller housing 150 (e.g., with housing bolt 135). Thus, in various embodiments, replacement of the electronic controller 152 (shown in FIG. 2) may be accomplished by replacing the entire electronic controller by releasing the controller housing 150 from motor housing 130 with a new electronic controller.

The motor housing 130 is not particularly limited according to various embodiments. For example, in various embodiments, the motor housing 130 may comprise at least one of nylon, polyetherimide ("PEI"), polyether ether ketone ("PEK"), polyetherketoneketone ("PEKK"), or polyetherketoneetherketoneketone ("PEKEKK"). For example, the motor housing 130 may comprise an amorphous thermoplastic PEI resin commercially available under the mark ULTEM™, a registered mark of SABIC Innovative Plastics. In various embodiments, motor housing 130 may comprise a metal, such as aluminum or steel.

Similarly, the controller housing 150 is not particularly limited according to various embodiments. For example, the controller housing 150 may comprise at least one of nylon, polyetherimide ("PEI"), polyether ether ketone ("PEK"), polyetherketoneketone ("PEKK"), or polyetherketoneetherketoneketone ("PEKEKK"). For example, the controller housing 150 may comprise an amorphous thermoplastic PEI resin commercially available under the mark ULTEM™, a registered mark of SABIC Innovative Plastics. In various embodiments, the controller housing 150 may comprise a metal, such as aluminum or steel.

With temporary reference to FIG. 3, FIG. 3 illustrates, in accordance with various embodiments, an aircraft cargo management system 100 where the PDU 151 comprises a planetary gearbox 140 housing planetary gear 141, which may be in mechanical communication with the motor 131.

Motor 131 is not particularly limited and may be, for example, an alternating current induction motor. In various embodiments, motor 131 may comprise a brake to allow the tire 125 mounted on wheel 120 (shown in FIG. 2) to be electrically locked into position when not in use. According to various embodiments, the PDU 151 may comprise a right angle gearbox 145 in mechanical communication with the planetary gearbox 140.

With reference back to FIG. 2, an internal spline 183 may be in mechanical communication with the right angle gearbox 145. The right angle gearbox 145 is not particularly limited and may include a worm gear and/or a beveled gear. For example, according to various embodiments, internal spline 183 may be received by a gear 191. In various embodiments, the gear 191 may form part of right angle gearbox 145, which may be in mechanical communication with planetary gearbox 140. For example, in various embodiments, gear 191 may be in mechanical communication with the worm 192, which may be in mechanical communication with planetary gearbox 140. According to various embodiments, worm 192 may allow for a high gear reduction and, in various embodiments, prevent or resist back drive due a high level of reflected inertia. Accordingly, in various embodiments, worm 192 may be self-locking when not in use. Furthermore, according to various embodiments, worm 192 may help to vertically offset the centerline of axle 115 (e.g., the axis of rotation of axle 115 around the y-axis) with the centerline of planetary gearbox 140 (e.g., along the x-axis). As used herein, the term "vertically offset" may include being at a different vertical position, for example, along the z-axis.

With continued reference to FIG. 2, in various embodiments, an external spline 180 of the axle 115 may be received by the internal spline 183. In various embodiments, axle 115 may comprise an external spline 180. According to various embodiments, external spline 180 may be separate from axle 115 and, thus, may be in mechanical communication with axle 115, which may be in mechanical communication with wheel 120. The internal spline 183 and the external spline 180 are not particularly limited. For example, in various embodiments, internal spline 183 and/or the external spline 180 may comprise an involute-form spline, a straight-sided spline, and/or a polygon spline (e.g., a polygon drive). For example, in various embodiments, the polygon spline may comprise a three-sided (three lobes) and/or four-sided (four lobes) polygon connector, such as connectors conforming to German DIN Standards 32711 and 32712, such as connectors commercially available from Stoffel Polygon Systems, Incorporated.

In various embodiments, tire 125 may be mounted on wheel 120. Wheel 120 is not particularly limited and may comprise any now known or hereinafter developed wheel suitable for transporting cargo. Moreover, in various embodiments, tire 125 is not particularly limited and may comprise any now known or hereinafter developed tire suitable for transporting cargo. For example, the aircraft cargo management system 100 may comprise a compliant tire, which may be mounted on the wheel 120. As used herein, the term "compliant tire" may include any tire configured to radially flex and/or deform in a controlled manner under a load. For example, a compliant tire may comprise a strategically defined geometry and material designed to allow for a desired deflection under a given load. Accordingly, in various embodiments, an aircraft cargo handling system with a compliant tire may permit the mounting of the PDU 151 without a suspension system 220.

In various embodiments, a portion of the aircraft cargo management system 100 may comprise a suspension system 220. For example, as illustrated in FIG. 2, axle 115 may be mounted on a suspension system 220. In various embodiments, suspension system 220 may comprise a button plunger 210 and a compression spring 215. According to various embodiments, the PDU 151 may also be mounted on a suspension system 220, which may also comprise button plunger 210 and compression spring 215. A suspension system and/or a compliant tire may be desirable to facilitate traction with light cargo, while also avoiding damage to heavy cargo with stiff undercarriages.

With reference to FIG. 4, an aircraft cargo management system 400 with PDU 251 is illustrated, which may comprise a controller housing 150, motor housing 130, planetary gearbox 240, and a vertically offset gearbox 245. In various embodiments, aircraft cargo management system 400 may comprise a support structure 101 comprising a first rail 110 and a second rail 111, the first rail 110 arranged parallel to the second rail 111.

In various embodiments, a wheel 120 may be mounted on an axle 115, which may be mounted to the first exterior face 102 and pass through the second exterior face 104. For example, as illustrated in FIG. 4, the axle 115 may pass through the first exterior face 102 and the second exterior face 104. According to various embodiments, axle 115 may be secured by end fastener 113 and bolt 119. In various embodiments, an aircraft cargo handling system may comprise a PDU 251 mounted to the axle 115 and configured to rotate the axle 115 about an axis. In various embodiments, PDU 251 may be mounted to the support structure 101 via a first bolt 117 and with spacer 116.

In various embodiments, vertically offset gearbox 245 may be in mechanical communication with the planetary gearbox 240 and internal spline 183 (shown in FIG. 2). For example, according to various embodiments, internal spline 183 may be received by a gear 191, which may form part of vertically offset gearbox 245. Vertically offset gearbox 245 is not particularly limited, and may include various gears such as helical and/or double helical gears. In various embodiments, the centerline of axle 115 of the aircraft cargo management system 400 may be offset from the centerline of a drive shaft of the motor 131 contained in motor housing 130. For example, in various embodiments, the axle 115 may be perpendicular to a different position along the z-axis than a drive shaft of the motor 131 contained in motor housing 130. Therefore, in various embodiments, incorporating the vertically offset gearbox 245 with an aircraft cargo management system 400 may be desirable, for example, to ensure that the controller housing 150, the motor housing 130, the planetary gearbox 240 and vertically offset gearbox 245 do not contact cargo moving above these aforementioned housing and systems. The vertical offset is not particularly limited and may include a height offset from about 0.1 inches (about 0.254 centimeters) to about 1 inch (about 2.54 centimeters), from about 0.2 inches (about 0.508 centimeters) to about 0.8 inches (about 2.032 centimeters), from about 0.3 inches (about 0.762 centimeters) to about 0.5 inches (about 1.27 centimeters), and from about 0.3 inches (about 0.762 centimeters) to about 0.4 inches (about 1.016 centimeters), where the term about in this context only may include a value within ±10%.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosed embodiments. The scope of the claimed embodiments is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. §112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft cargo management system comprising:
   a support structure comprising a first rail and a second rail, the first rail arranged parallel to the second rail, wherein the first rail has a first exterior face and the second rail has a second exterior face;
   a wheel mounted on an axle with the wheel disposed between the first rail and the second rail, the axle mounted to the first exterior face and passing through the second exterior face; and
   a power drive unit ("PDU") mounted to the axle and configured to rotate the axle about an axis, wherein the PDU is mounted to the support structure at the second exterior face.

2. The aircraft cargo management system of claim 1, wherein the PDU comprises:
   a motor housing,
   a motor housed in the motor housing
   a controller housing removably coupled to the motor housing, and
   an electronic controller housed in the controller housing and electrically coupled to the in motor, wherein the electronic controller and the controller housing are modular units of the PDU and are configured to be uncoupled from the motor and the motor housing; and
   a planetary gearbox in mechanical communication with the motor, wherein a centerline of the axle is vertically offset from a centerline of the planetary gearbox.

3. The aircraft cargo management system of claim 2, wherein the PDU comprises an internal spline and a right angle gearbox in mechanical communication with the planetary gearbox.

4. The aircraft cargo management system of claim 3, wherein an external spline of the axle is received by the internal spline.

5. The aircraft cargo management system of claim 2, wherein the PDU further comprises a vertically offset gearbox in mechanical communication with the planetary gearbox and an internal spline.

6. The aircraft cargo management system of claim 5, wherein an external spline of the axle is received by the internal spline.

7. The aircraft cargo management system of claim 1, wherein a compliant tire is mounted on the wheel.

8. The aircraft cargo management system of claim 1, wherein the axle is mounted on a suspension system.

9. The aircraft cargo management system of claim 2, wherein the controller housing comprises at least one of nylon, polyetherimide ("PEI"), polyether ether ketone ("PEK"), polyetherketoneketone ("PEKK"), or polyetherketoneetherketoneketone ("PEKEKK").

10. A power drive unit ("PDU") comprising:
    a controller housing, the controller housing comprising a first mating feature;
    an electronic controller housed in an interior of the controller housing;
    a motor housing, the motor housing comprising a second mating feature, wherein the controller housing is removably coupled to the motor housing by a bolt extending through the first mating feature and the second mating feature;
    a motor housed in an interior of the motor housing;
    a first connector located at an exterior surface of the motor housing; and
    a second connector located at an exterior surface of the controller housing, wherein the first connector is configured to mate with the second connector and to conduct electricity between the motor and the electronic controller when the controller housing is coupled to the motor housing, and wherein the second connector is mounted to the controller housing such that decoupling the controller housing from the motor housing decouples the second connector from the first connector.

11. The PDU of claim 10, wherein the first connector is at least one of a pigtail connector, a header connector, or a pin-to-socket connector.

12. The PDU of claim 10, wherein the motor housing comprises at least one of nylon, polyetherimide ("PEI"), polyether ether ketone ("PEK"), polyetherketoneketone ("PEKK"), or polyetherketoneetherketoneketone ("PEKEKK").

13. The PDU of claim 10, wherein the motor is an alternating current induction motor.

14. The PDU of claim 10, wherein the controller housing comprises at least one of nylon, polyetherimide ("PEI"), polyether ether ketone ("PEK"), polyetherketoneketone ("PEKK"), or polyetherketoneetherketoneketone ("PEKEKK").

15. The PDU of claim 10, wherein the first mating feature comprises a first opening defined by a portion of the controller housing, and the second mating feature comprises a second opening defined by a first flange extending from motor housing.

16. The PDU of claim 15, wherein the second mating feature further comprises a third opening defined by a second flange extending from the motor housing, wherein the portion of the controller housing defining the first opening is located between the first flange and the second flange.

* * * * *